Patented Oct. 20, 1936

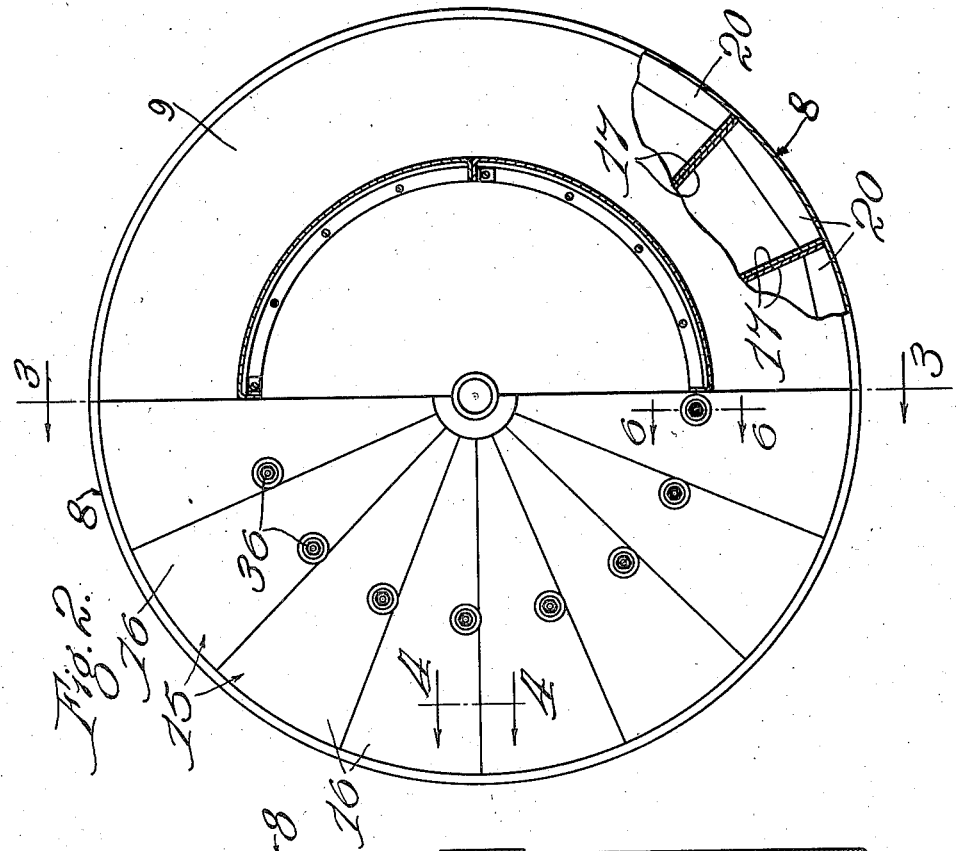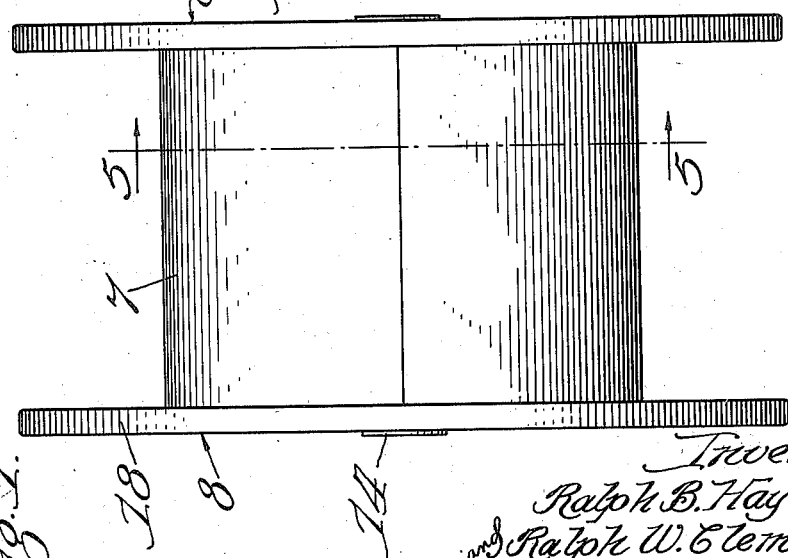

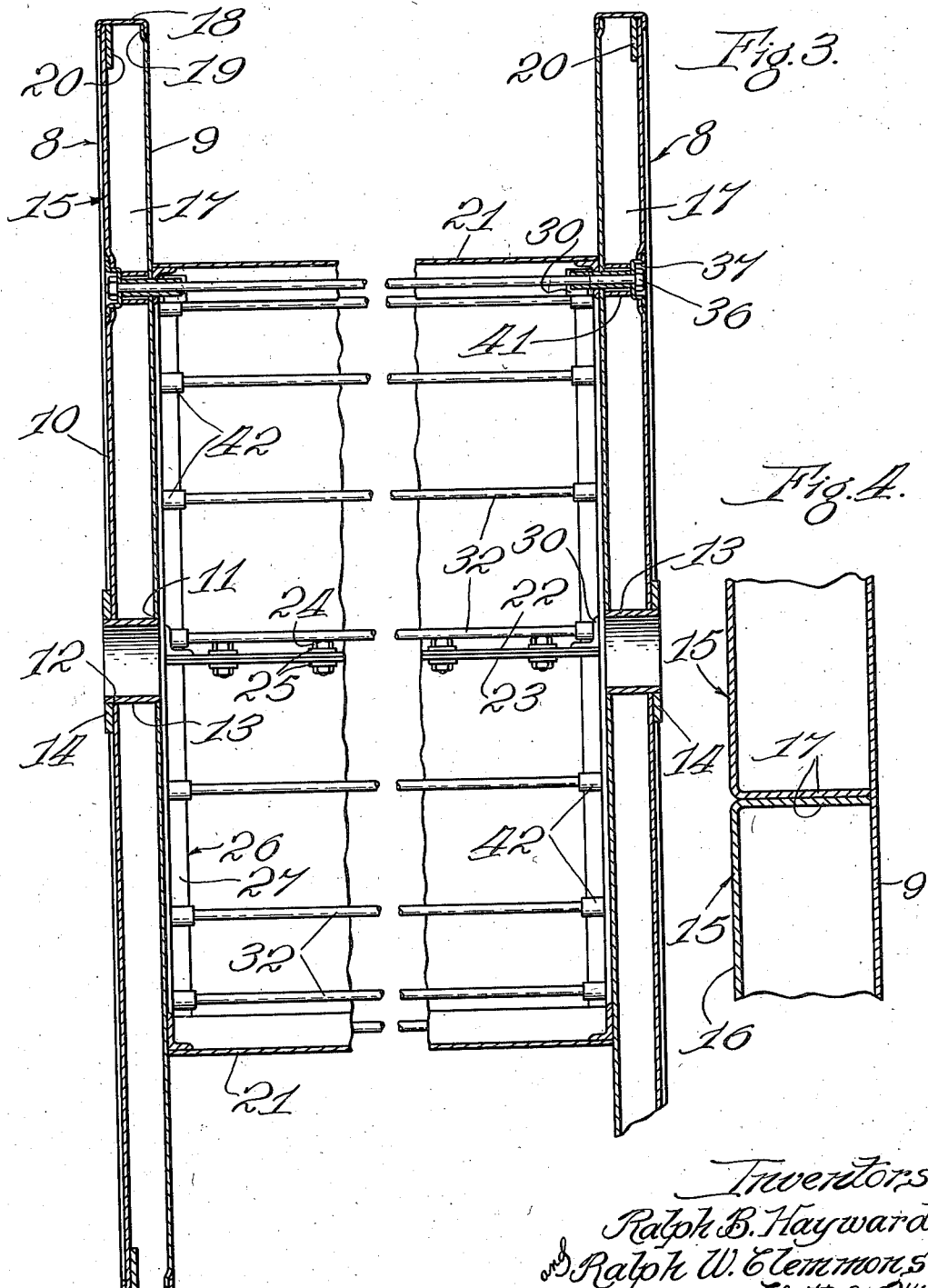

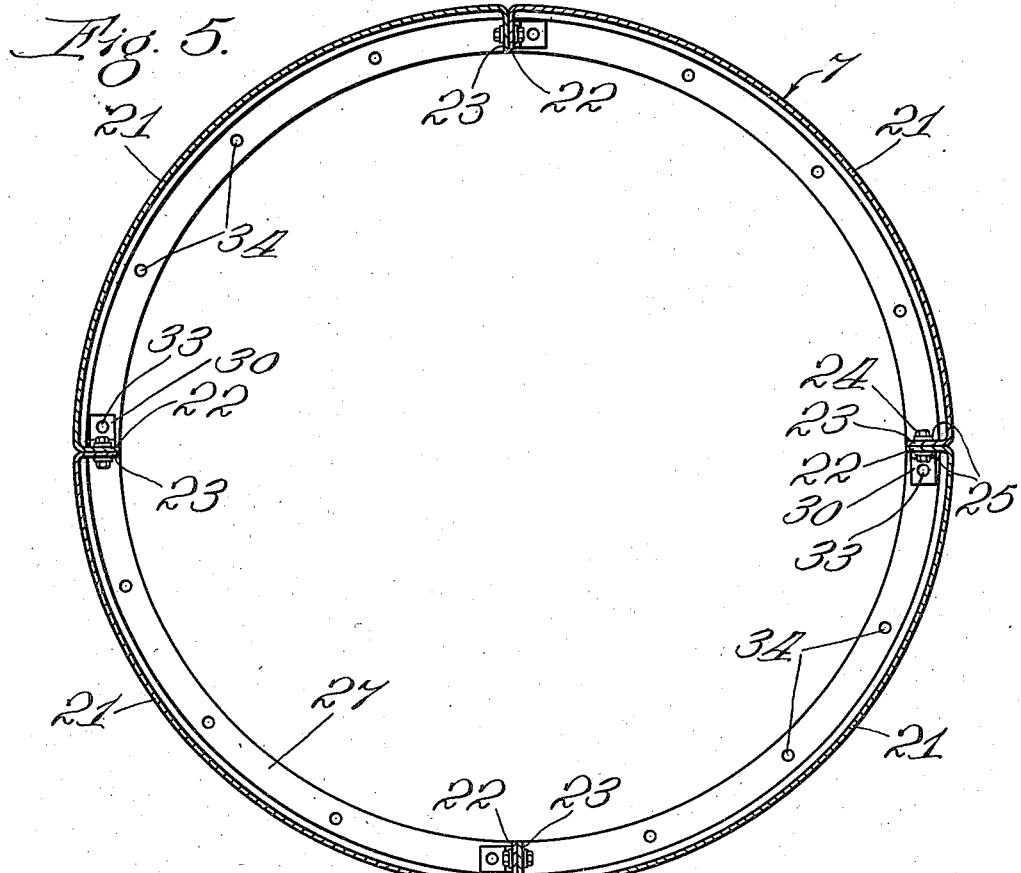
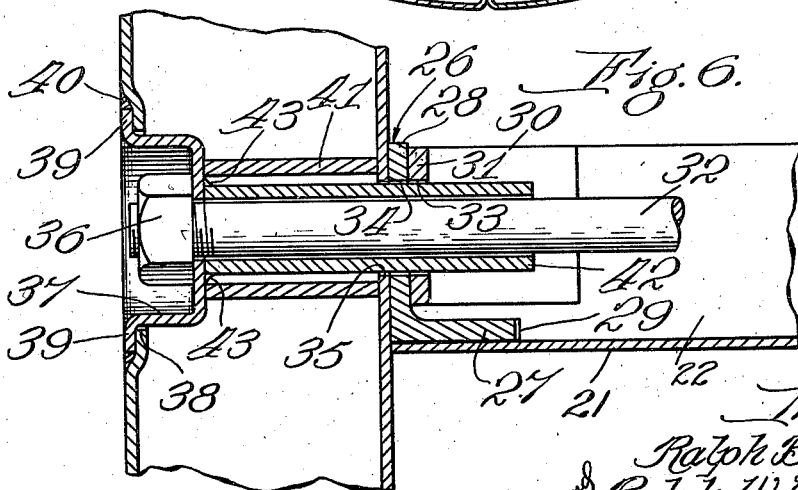

2,058,150

UNITED STATES PATENT OFFICE 2,058,150

REEL

Ralph B. Hayward, La Grange, and Ralph W. Clemmons, Chicago, Ill.

Application July 17, 1933, Serial No. 680,848

3 Claims. (Cl. 242—77)

Our invention relates, as to one phase thereof, to disklike sheet metal structures as for example and more especially those forming the heads of reels provided for the winding thereon of electric cables, or the like; and as to another phase thereof, to the drum portions of reels and on which the cables, or the like, are wound.

Our primary objects are to provide constructions of disklike sheet metal structures and particularly provided as heads of reels, and drum structures of reels which, while presenting the desired strength, stiffness and durability, may be manufactured of lighter gauge metal and at less cost and be of lighter weight than such structures as hitherto provided; to so form the drum that it may be shipped in knock-down condition and be quickly assembled for use; and other objects as will be manifest from the following description.

Referring to the accompanying drawings:

Figure 1 is a view in elevation of a reel embodying our invention.

Figure 2 is an end view of the reel with portions thereof sectioned and broken away to disclose details of construction.

Figure 3 is an enlarged broken section taken at the line 3—3 on Fig. 2 and viewed in the direction of the arrows.

Figure 4 is an enlarged broken sectional view taken at the line 4—4 on Fig. 2 and viewed in the direction of the arrows.

Figure 5 is an enlarged sectional view taken at the line 5—5 on Fig. 1 and viewed in the direction of the arrows; and Figure 6, an enlarged fragmentary sectional, broken, view taken at the line 6—6 on Fig. 2 and viewed in the direction of the arrows.

Referring to the particular illustrated construction, the reel as shown comprises a hub, or drum portion 7, and sheet metal heads 8 positioned at the ends of the drum 7 and secured thereto as hereinafter described.

Each head 8 comprises spaced apart disk-like members 9 and 10 centrally apertured as represented at 11 and 12, respectively, to receive an arbor tube 13 secured in place therein, as for example by welding these parts together, with a washer 14 on the outer end of the tube welded thereto and to the member 10.

The member 9 is shown as formed of a substantially flat sheet metal disk which, in the reel construction shown, constitutes the inner face of the head.

The member 10 comprises an annular series of radially disposed sheet metal segments 15 secured together as hereinafter described and forming in effect a sectional disk, the segments 15 presenting plate portions 16 shown as extending substantially parallel with, and in spaced relation to, the member 9.

Interposed between the members 9 and 10 are reinforcing ribs 17 which radiate from the central axis of the head, these ribs engaging at their opposite longitudinal edges with the members 9 and 10 and in effect forming braces.

The ribs 17 in the particular construction shown are formed integrally with the plate portions 16 of the segments 15, being provided as flanges extending along the radially disposed edges of the segments, adjacent ones of the flanges 17 fitting flatwise together as shown and radiating from the center of the head.

Each head 8 also comprises a circular tread portion shown as formed of a channel ring 18 embracing, and welded to, the outer peripheral margins of the segments 15 and the outer peripheral margin of the disk-member 9, the latter being shown as slightly inwardly deflected as represented at 19 to render the surface of the head 8 adjacent the drum portion 7, free of obstruction.

The tread portion of the head 8 is strengthened and rendered more rigid by providing at its periphery a series of gusset plates 20 located in the spaces between the flanges 17, these plates fitting at their sides flatwise against the inner surfaces of the portions 16 of the segments 15 and at their curved outer edges against the inner periphery of the ring 18, and welded to the portions 16 and the ring 18.

The hub, or drum, portion 7 of the reel comprises a sheet metal cylindrical member, or drum-shell, shown as formed of sections 21 each extending the full length of the drum and in the particular construction shown each constituting a quarter section thereof. The longitudinal edges of the sections 21 are provided with inwardly extending rib-forming flanges 22 and 23, shown as extending substantially the full length of the sections 21, adjacent ones of these flanges being flatwise opposed and radiating from tthe center of the drum as shown in Fig. 5, in which position they are connected together, as for example, by the bolts represented at 24, washers represented at 25 being preferably interposed between the heads and nuts of the bolts, and the flanges which they oppose.

The hub, or drum portion, 7 of the reel also comprises angle rings 26 presenting the angularly disposed ring portions 27 and 28 and serving as means for circumferentially reinforcing the shell against compression stresses. The rings 26 are located in the ends of the drum-shell and in disconnected relation thereto whereby the shell is adapted for lengthwise movement relative to these rings, the ring portions 28 flatwise opposing the inner faces of the heads 8.

The ends of the flanges 22 and 23 are partially cut away, as represented of a pair thereof at 29, to receive the angle rings 26.

Secured to the drum-shell at the ends of its flanges 22 and 23, as by certain of the bolts 24 above referred to, are angle clips 30 the portions thereof represented at 31, and forming lugs, flatwise opposing the inner faces of the portions 28 of the rings 26, and serving to prevent inward displacement of the rings 26.

The heads 8 and drum 7 are shown as secured together by means of a circular series of tie rods shown as bolts 32, which extend through openings 33, 34 and 35 in the lugs 31, rings 26 and head members 9, respectively, and through openings in the segments 15; the heads and nuts provided on these bolts at their opposite ends engaging with the outer members 10, respectively, of the heads 8 as illustrated of the nut 36 in Figs. 3 and 6, to effect the desired clamping action between the several parts, it being understood from the foregoing that in the tightening of the tie rods 32, the heads 8 engage at their portions 10 with the ends of the connected shell segments and rigidly clamp the shell between the heads.

It is desirable that the heads and nuts of the bolts 32 be inset relative to the plane of the outer surfaces of the members 10 to avoid undesirable projections thereon, and to this end the portions of the members 10 at which these head-forming parts of the bolts engage are formed of embossed washers 37 set into openings 38 in the segments 15 and lapping at peripheral flanges 39 thereon, the walls of the openings 38 to which they are secured as by welding them thereto as indicated at 40.

To augment the rigidity of the heads 8 each is provided with tubular spacer members 41 interposed between the washers 37 and the opposite head members 9, in position to surround the bolts 32 as shown more particularly in Fig. 6.

The construction also comprises a circular series of ferrules 42 secured at their outer ends to the inner faces of the washers 37, as for example by welding them thereto as represented at 43, these ferrules being located within the washers 41 and surrounding the bolts 32 and of such length that in the assembled position of the parts they extend at their inner ends through the openings 35, 34 and 33, whereby the heads and drum portion are adapted for ease of assembly.

The feature of forming the sheet metal drum with ribs extending lengthwise thereof is of advantage as the ribs serve as stiffeners permitting of the forming of the body portion of the drum of much thinner sheet metal than would otherwise be required.

Furthermore, the feature of forming the drum of segments, preferably with the rib-forming flanges thereon, is of advantage as thereby the drum may be shipped, if desired, in knock-down condition, thus minimizing the space required for shipment, and the parts readily assembled at the place of use.

While we have illustrated and described one embodiment of our invention, we do not wish to be understood as intending to limit the same thereto as the same may be variously modified and altered and the invention embodied in other forms of structure without departing from the spirit of the invention.

What we claim as new, and desire to secure by Letters Patent, is:

1. A reel comprising heads, a drum-shell between said heads, ribs on said shell extending generally lengthwise of said shell, means reinforcing said shell against circumferential compression stresses, and means securing together said shell and heads, said ribs being recessed at their ends to receive said reinforcing means.

2. A reel comprising heads, a drum-shell between said heads and formed of sections extending lengthwise of the shell and inwardly extending flanges on said sections at which said sections are secured together, means reinforcing said shell against circumferential compression stresses, and means securing together said shell and heads, said flanges being recessed at their ends to receive said reinforcing means.

3. A head construction comprising spaced apart disklike members, radially disposed ribs interposed between said members, said members being spaced apart at their outer peripheries, a tread member at the outer peripheries of said disklike members having an inwardly facing channel into which the outer peripheries of said disklike members extend, a series of gusset plates interposed between said ribs at said tread member and reinforcing the latter, and tubular spacers interposed between said disklike members.

RALPH B. HAYWARD.
RALPH W. CLEMMONS.